US011506139B2

(12) United States Patent
Kannan et al.

(10) Patent No.: US 11,506,139 B2
(45) Date of Patent: Nov. 22, 2022

(54) ENGINE CONTROL SYSTEM FOR ENABLING MULTI-MODE DRIVABILITY IN OFF-ROAD VEHICLES

(71) Applicant: Mahindra and Mahindra Limited, Tamil Nadu (IN)

(72) Inventors: Subramani Kannan, Kancheepuram (IN); Haldorai Rajan, Kancheepuram (IN); Ayyapa Das, Kancheepuram (IN); Sridhar Rao, Kancheepuram (IN); Balasubramanian Prabakaran, Kancheepuram (IN); Natesh Kumar, Kancheepuram (IN); Ganesan Manoj, Kancheepuram (IN); Joel Jason, Kancheepuram (IN)

(73) Assignee: MAHINDRA AND MAHINDRA, Tamil Nadu (IN)

( * ) Notice: Subject to any disclaimer, the term of this patent is extended or adjusted under 35 U.S.C. 154(b) by 0 days.

(21) Appl. No.: 17/217,491

(22) Filed: Mar. 30, 2021

(65) Prior Publication Data

US 2021/0301754 A1 Sep. 30, 2021

(30) Foreign Application Priority Data

Mar. 31, 2020 (IN) ............................. 202041014438

(51) Int. Cl.

| | |
|---|---|
| ***B60T 7/12*** | (2006.01) |
| ***F02D 41/40*** | (2006.01) |
| ***F02D 41/00*** | (2006.01) |

(52) U.S. Cl.

CPC ....... *F02D 41/401* (2013.01); *F02D 41/0057* (2013.01)

(58) Field of Classification Search

CPC ... B60W 2510/0619; B60W 2710/0622; F02B 19/1052; F02B 19/1085; F02D 35/0046

USPC ......... 701/103–105, 108; 123/434, 429, 430, 123/294, 295

See application file for complete search history.

(56) References Cited

U.S. PATENT DOCUMENTS 5,823,160 A * 10/1998 Oda .................... F02B 27/0215 123/295
5,970,947 A * 10/1999 Iida ....................... F02D 41/307 123/295
6,062,189 A * 5/2000 Kaneko ............... F02D 41/3029 123/295

(Continued)

*Primary Examiner* — John Kwon
(74) *Attorney, Agent, or Firm* — Lathrop GPM LLP

(57) ABSTRACT

The present disclosure envisages an engine control system (100) that enables multi-mode drivability in off-road vehicles. The system (100) comprises a mode selection device (101) and an electronic control unit (ECU) (104). The mode selection device (101) is configured to receive an input from an operator for selection of at least one mode of engine operation, and to generate a mode selection signal corresponding to the input. The electronic control unit (ECU) (104) is communicatively coupled with the mode selection device (101) to receive the mode selection signal and generate at least one control signal. The electronic control unit (ECU) (104) is further configured to control a fuel injection system (106) of the vehicle based on the selected mode according to the load requirement, thereby facilitating multi-mode drivability. The system (100) allows a vehicle to operate in different operating modes as per terrain conditions.

8 Claims, 5 Drawing Sheets

(56) References Cited

U.S. PATENT DOCUMENTS 6,062,191 A * 5/2000 Ooba .................. F02D 41/3029
123/295
6,425,366 B1 * 7/2002 Ogawa .................... F02D 41/10
123/295
6,510,834 B1 * 1/2003 Tomita .................. F02D 41/307
123/295
6,581,572 B1 * 6/2003 Hurley ................ F02D 41/2422
123/478
9,856,837 B2 * 1/2018 Dunn ..................... F02M 43/00
10,947,948 B1 * 3/2021 Glugla .................... F02P 15/02
2002/0020386 A1 * 2/2002 Ogawa .................. F02D 41/402
123/295
2002/0166515 A1 * 11/2002 Ancimer ................... F02B 1/12
123/27 R
2005/0113993 A1 * 5/2005 Son ........................ F01M 11/10
701/29.5
2007/0271026 A1 * 11/2007 Hijikata ................ F02D 11/105
701/115
2008/0300768 A1 * 12/2008 Hijikata ................ F02D 41/021
701/102
2010/0076663 A1 * 3/2010 Jinno ...................... B60L 58/20
701/102
2011/0202259 A1 * 8/2011 Fukushima ......... F02D 41/0025
701/104
2012/0072093 A1 * 3/2012 Saruwatari ............ F02D 41/068
701/103
2015/0360681 A1 * 12/2015 Kanayama ............ B60W 20/10
701/22
2016/0003168 A1 * 1/2016 Leone ................... F02D 35/021
123/406.47
2016/0003169 A1 * 1/2016 Leone ................. F02D 41/3094
123/481
2016/0177844 A1 * 6/2016 Fuentes Utrilla ...... A01B 45/00
701/110

* cited by examiner

ENGINE CONTROL SYSTEM FOR ENABLING MULTI-MODE DRIVABILITY IN OFF-ROAD VEHICLES

CROSS REFERENCE TO RELATED APPLICATIONS

This application claims priority to Indian application number 202041014438, filed on Mar. 31, 2020, the disclosure of which is incorporated by reference herein in its entirety.

FIELD

The present disclosure relates to a system that controls the operation and power output of an engine of a vehicle. More particularly, the present disclosure relates to a system that controls the operation of engine of the vehicles such as mining machines, tractors and other off-road vehicles.

DEFINITION

As used in the present disclosure, the following terms are generally intended to have the meaning as set forth below, except to the extent that the context in which they are used indicate otherwise Off-road vehicle—The term "off-road vehicle" hereinafter refers to a type of vehicle that is capable of driving on uneven and difficult terrains/farm lands.

Governing—The term "governing" hereinafter refers to a process of governing in an internal combustion engine wherein the speed and the torque of the engine are made to follow the defined path as per calibration.

BACKGROUND

The background information herein below relates to the present disclosure but is not necessarily prior art.

Typically, a vehicle such as a work vehicle is specifically designed to carry variable loads in different soil and terrain conditions. For example, for the work vehicle such as a tractor, when being driven in a flat terrain condition or in a light load condition, the power requirement is less. Hence, the tractor operates in a fuel-efficient manner. On the other hand, when the load is high and the terrain is muddy or rocky, the power requirement of the tractor is comparatively higher for carrying the load. Therefore, the tractor operates in a less fuel-efficient manner but provides better productivity with aggressive governing. Also, the tractor engine may stall when the engine system reaches its maximum permissible load carrying capacity.

There is, therefore, felt a need of an engine control system that enables drivability in off-road vehicles in different modes as per terrain conditions, and that alleviates the aforementioned drawbacks.

OBJECTS

Some of the objects of the present disclosure, which at least one embodiment herein satisfies, are as follows:

An object of the present disclosure is to provide an engine control system which enables multi-mode drivability in off-road vehicles.

Another object of the present disclosure is to provide an engine control system that allows a vehicle to operate in different operating modes as per varying load conditions.

Still another object of the present disclosure is to provide an engine control system with a mode selection feature that facilitates a driver/operator to select an operating mode as per requirement.

Yet another object of the present disclosure is to provide an engine control system that enables a user to select a suitable mode for a specific requirement of fuel consumption and/or productivity.

Still yet another object of the present disclosure is to provide an engine control system that is user friendly.

Other objects and advantages of the present disclosure will be more apparent from the following description, which is not intended to limit the scope of the present disclosure.

SUMMARY

The present disclosure envisages an engine control system that enables multi-mode drivability in off-road vehicles. The engine control system comprises a mode selection device and an electronic control unit (ECU). The mode selection device is configured to receive an input from an operator for selection of at least one mode of engine operation, and to generate a mode selection signal corresponding to the input. The electronic control unit is communicatively coupled with the mode selection device to receive the mode selection signal and generate at least one control signal. The electronic control unit is further configured to control a fuel injection system of the vehicle based on the selected mode according to the load requirement, thereby facilitating multi-mode drivability.

In an embodiment, the fuel injection system is a common rail fuel injection system.

In an embodiment, wherein the mode selection device includes a first mode activation switch, a second mode activation switch, and a third mode activation switch. The first mode activation switch is communicatively coupled with the ECU. The first mode activation switch is configured to generate a first mode selection signal to be communicated to the ECU. The second mode activation switch is communicatively coupled with the ECU. The second mode activation switch is configured to generate a second mode selection signal to be communicated to the ECU. The third mode activation switch is communicatively coupled with the ECU. The third mode activation switch is configured to generate a third mode selection signal to be communicated to the ECU.

In another embodiment, the ECU is configured to generate a first control signal on receipt of the first mode selection signal to activate the fuel injection system to inject a predetermined quantity of fuel into the cylinders of the engine and thereby to run the engine in an economy mode (alternatively, it can be called as 'fuel or diesel saver mode'). The ECU is configured to generate a second control signal on receipt of the second mode selection signal to activate the fuel injection system to inject a first predetermined higher quantity of fuel than the predetermined quantity of fuel corresponding to the first control signal into the cylinders of the engine and thereby to run the engine in a normal mode. The ECU is configured to generate a third control signal on receipt of the first mode selection signal to activate the fuel injection system to inject a second predetermined higher quantity of fuel than the first predetermined higher quantity of fuel corresponding to the second control signal into the cylinders of the engine and thereby to run the engine in a boost mode (alternatively, it can be called as 'power mode').

In an embodiment, the system includes a repository and an engine RPM sensor. The engine RPM sensor communicatively coupled with the ECU and configured to generate a sensed engine RPM signal. The repository is configured to store a plurality of fuel injection maps and drivability maps, combustion maps (Exhaust Gas Recirculation (EGR), timing, etc.) corresponding to the modes of engine operation, each of the fuel injection maps and drivability maps, combustion maps (EGR, timing, etc.) including distinct control signal values for fuel injection and drivability, EGR, timing, etc. corresponding to sensed engine RPM signal values. The ECU is configured to read the repository and to extract a unique control signal value corresponding to the mode of engine operation selected by the operator through the mode selection device, and the instantaneous sensed RPM signal value.

In an embodiment, the ECU is configured to generate control signals for the common rail fuel injection system to inject higher fuel and vary the drivability, EGR, timing, etc. than diesel saver mode into the cylinders of the engine, on receipt of the second mode selection signal.

In another embodiment, the ECU is configured to generate control signals for the common rail fuel injection system to inject higher fuel and vary the drivability, EGR, timing, etc. than normal mode into the cylinders of the engine, on receipt of the third mode selection signal.

In still another embodiment, the maps are based on at least one of torque response curves, fueling response curve, governing performance curve EGR maps, timing maps or high idle curve as defined for each of the economy mode, normal mode and boost mode.

In an embodiment, the system includes a plurality of sensors configured to sense various parameters of the fuel injection system, and further configured to generate sensed signals. The ECU is configured to cooperate with the sensors to receive the sensed signals, and further configured to control the fuel injection system. In another embodiment, the plurality of sensors includes an accelerator pedal sensor.

BRIEF DESCRIPTION OF THE ACCOMPANYING DRAWING

An engine control system for enabling multi-mode drivability in off-road vehicles of the present disclosure will now be described with the help of the accompanying drawing, in which.

LIST OF REFERENCE NUMERALS

100—Engine control system
101—Mode selection device
101A—First mode activation switch
101B—Second mode activation switch
101C—Third mode activation switch
102—Plurality of sensors
104—Electronic Control Unit (ECU)
106—Fuel injection system
108—Repository
110—Engine speed (RPM) sensor

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, operations, elements, modules, units and/or components, but do not forbid the presence or addition of one or more other features, operations, elements, components, and/or groups thereof. The particular order of steps disclosed in the method and process of the present disclosure is not to be construed as necessarily requiring their performance as described or illustrated. It is also to be understood that additional or alternative steps may be employed.

The present disclosure envisages an engine control system for enabling multi-mode drivability in off-road vehicles. The engine control system for enabling multi-mode drivability in off-road vehicles (hereinafter referred to as "system 100") is now described with the help of FIG. 1 through FIG. 5.

Figure 1:
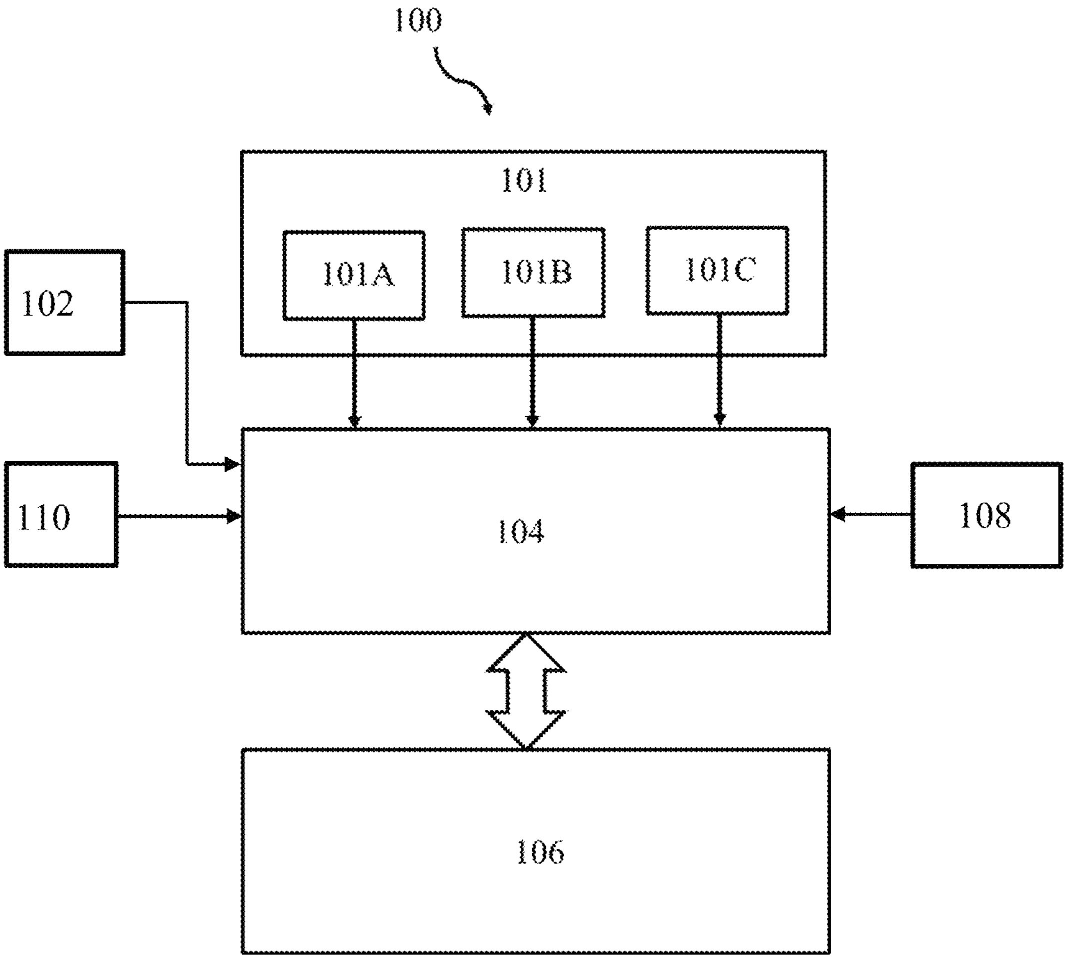
FIG. 1 illustrates a block diagram of an engine control system for enabling multi-mode drivability of off-road vehicles.

Referring to FIG. 1, the system 100 comprises a mode selection device 101 and an electronic control unit (hereinafter referred to as 'ECU') 104.

Figure 2:
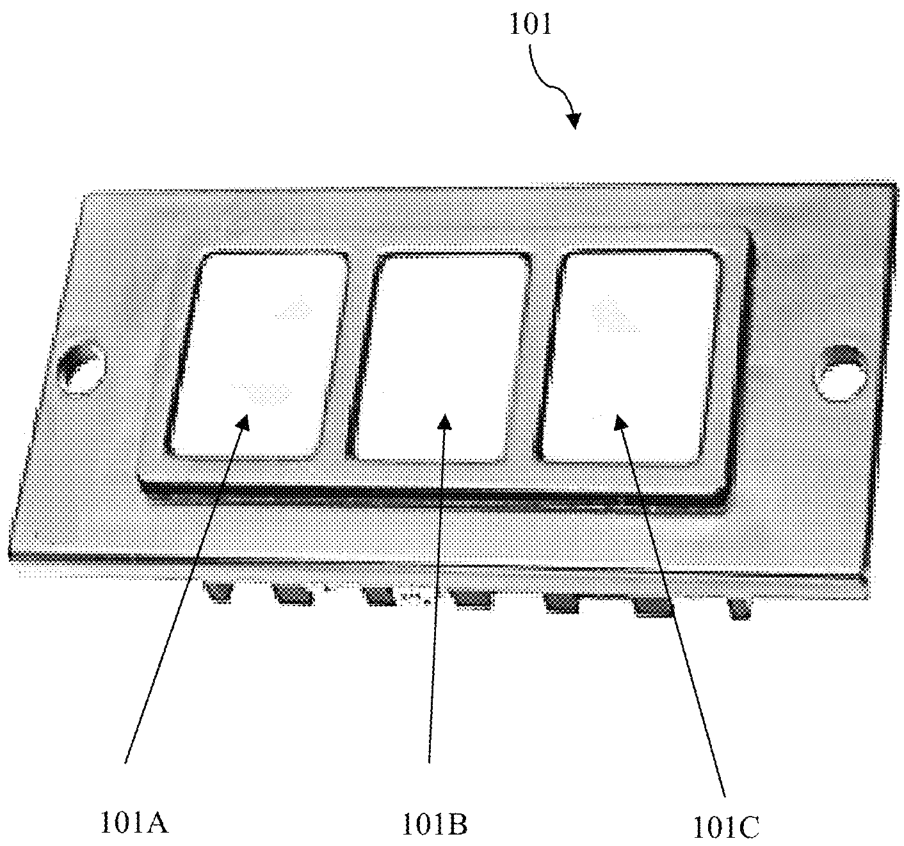
FIG. 2 illustrates a perspective view of a mode selection device of the system of FIG. 1.

The mode selection device 101 is configured to receive an input from an operator/user/driver for selection of at least one mode of engine operation, and to generate a mode selection signal corresponding to the received input. Referring to FIG. 2, the mode selection device 101 includes a first mode activation switch 101A, a second mode activation switch 101B, and a third mode activation switch 101C. The first mode activation switch 101A is communicatively coupled with the ECU 104. The first mode activation switch 101A is configured to generate a first mode selection signal to be communicated to the ECU 104. The second mode activation switch 101B is communicatively coupled with the ECU 104. The second mode activation switch 101B is configured to generate a second mode selection signal to be communicated to the ECU 104. The third mode activation switch 101C is communicatively coupled with the ECU 104. The third mode activation switch 101C is configured to generate a third mode selection signal to be communicated to the ECU 104. The mode selection device 101 is communicatively coupled with the ECU 104 through electrical wires, Bluetooth, Wi-Fi or any other wireless or wired technology.

The ECU 104 is communicatively coupled with the mode selection device to receive the mode selection signal and generate at least one control signal. The ECU 104 is further configured to control a fuel injection system 106 of the vehicle based on the selected mode according to the load requirement, thereby facilitating multi-mode drivability. In an embodiment, the fuel injection system 106 is a common rail fuel injection system.

In another embodiment, the ECU 104 is configured to generate a first control signal on receipt of the first mode selection signal to activate the fuel injection system 106 to inject a predetermined quantity of fuel into the cylinders of the engine and activate specific drivability/EGR/timing and other combustion maps to run the engine in an economy mode. The ECU 104 is configured to generate a second control signal on receipt of the second mode selection signal to activate the fuel injection system 106 to inject a first predetermined higher quantity of fuel than the predetermined quantity of fuel corresponding to the first control signal into the cylinders of the engine and activate specific drivability/exhaust gas recirculation (EGR)/timing and other combustion maps to run the engine in a normal mode. The ECU 104 is configured to generate a third control signal on receipt of the third mode selection signal to activate the fuel injection system 106 to inject a second predetermined higher quantity of fuel than the first predetermined higher quantity of fuel corresponding to the second control signal into the cylinders of the engine and activate specific drivability/exhaust gas recirculation (EGR)/timing and other combustion maps to run the engine in a power mode.

In an embodiment, the system 100 includes a repository 108 and an engine speed (RPM) sensor 110. The engine RPM sensor 110 is communicatively coupled with the ECU 104 and configured to generate a sensed engine RPM signal. The repository 108 is configured to store a plurality of engine operation maps corresponding to the modes of engine operation, each of the engine operation maps including distinct control signal values for fuel injection, drivability, exhaust gas recirculation (EGR), timing, etc. corresponding to sensed engine RPM signal values. The ECU 104 is configured to read the repository 108 and to extract a unique control signal value corresponding to the mode of engine operation selected by the operator through the mode selection device, and the instantaneous sensed RPM signal value.

In an embodiment, the ECU 104 is configured to generate control signals for the common rail fuel injection system to inject 10-15% more fuel and activate specific drivability/exhaust gas recirculation (EGR)/timing and other combustion maps than diesel saver mode into the cylinders of the engine, on receipt of the second mode selection signal. In another embodiment, the ECU 104 is configured to generate control signals for the common rail fuel injection system to inject 10-15% more fuel and activate specific drivability/exhaust gas recirculation (EGR)/timing and other combustion maps than normal mode into the cylinders of the engine, on receipt of the third mode selection signal.

The maps stored in the repository 108 are based on at least one of torque response curves, fueling response curve, governing performance curve, exhaust gas recirculation (EGR), timing maps/or high idle curve as defined for each of the economy mode, normal mode and boost mode.

Figure 3:
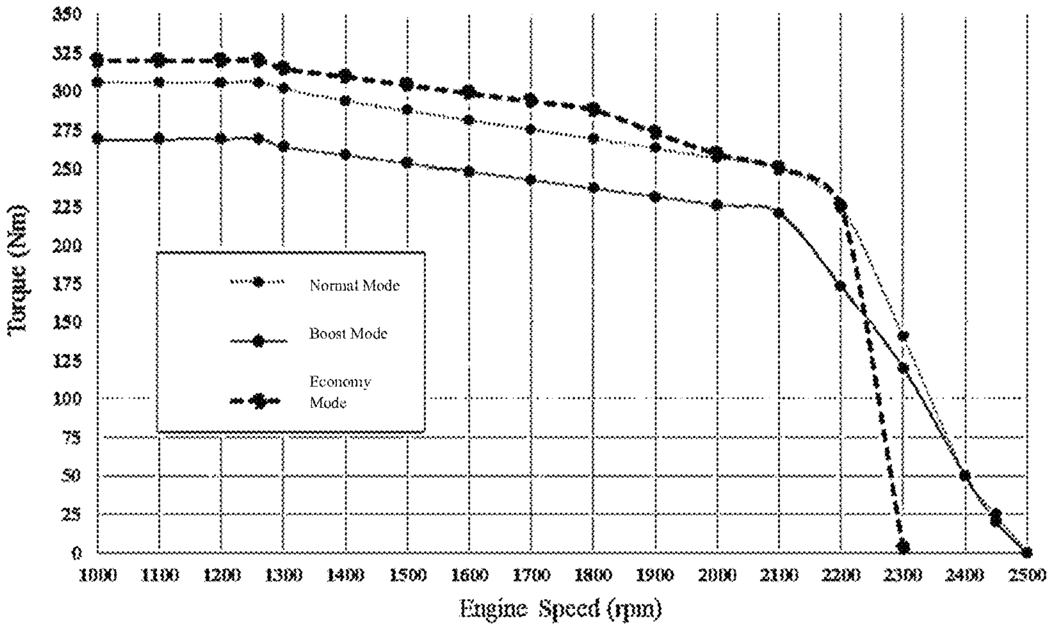
FIG. 3 illustrates a full load torque curve for various modes of operation defined by adjusting the full load fuel injection quantity.

FIG. 3 depicts a full load curve for the diesel saver mode, normal and power mode illustrates the relation between the engine speed (rpm) and the torque (Nm) produced by the engine for a full load. The curves in FIG. 3 indicate the relation between the engine speed (rpm) and the torque (Nm) with respect to the calibrated fuel injection quantity in order to achieve the required torque for the respective modes.

A drivability map is tuned in the ECU to achieve a required governing performance in respective modes. For diesel saver and normal mode, the governing by the ECU is configured to be sluggish, that is, the response for a change in engine rpm is configured to be sluggish and for the power mode the governing by the ECU is configured to be aggressive, that is, the response for a change in engine rpm by the ECU is configured to be quick. Sluggish governing leads to fuel efficiency improvement and aggressive governing leads to productivity improvement.

Figure 4:
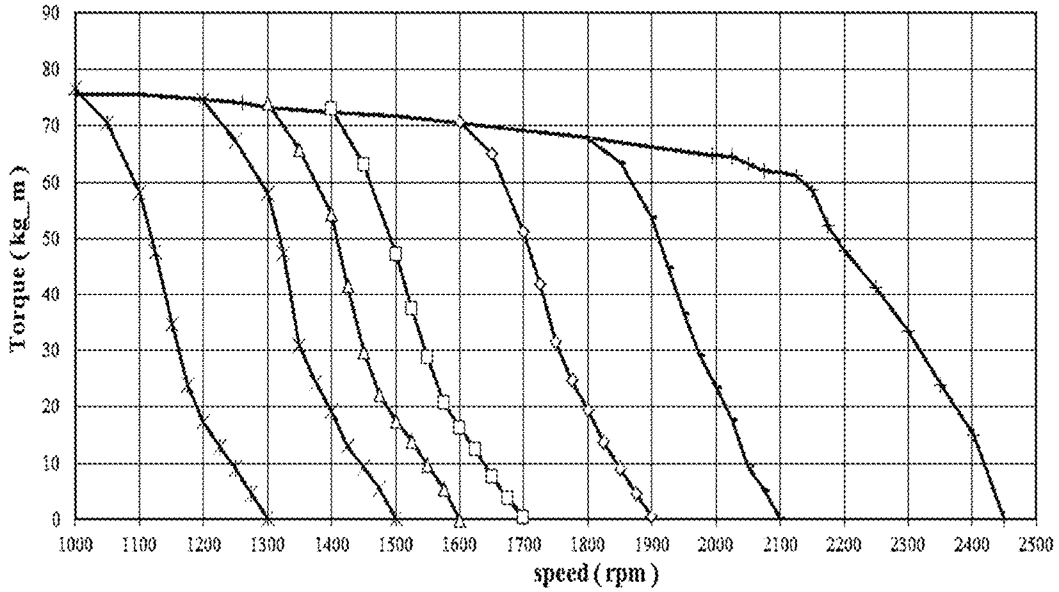
FIG. 4 illustrates a graph of torque vs. speed plotted for a selected throttle when the load is changed from no load to full load condition for diesel saver, power and normal modes.

FIG. 4 illustrates governing performance curves for diesel saver, power and normal modes followed by the ECU and shows a relation between the engine speed (rpm) and the torque (Kg-m) produced by the engine for a fixed throttle. In an embodiment, a high idle response curve (not shown in figures) followed by the ECU is based on the governing percentage. On the other hand, the high idle is maximum engine speed in a no-load condition. For normal mode and diesel saver mode, high idle is defined and configured in the ECU considering sluggish governing and for the power mode high idle is defined and configured in the ECU considering aggressive governing. Further, the high idle speed is tuned in the ECU to get the required governing performance at required higher engine speed.

Figure 5:
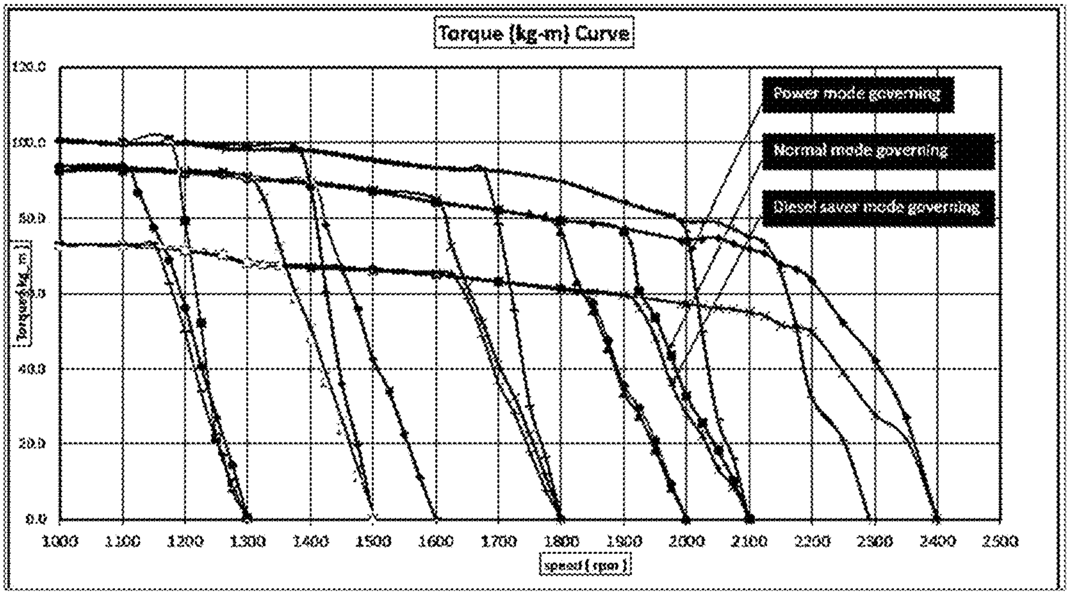
FIG. 5 illustrates a graph of torque vs. speed plotted for three modes (power/normal/diesel saver modes) are represented by their respective full load torque curves.

FIG. 5 depicts three modes, i.e., power mode, normal mode, diesel saver mode being represented by their respective full load torque curves with reference to 2100 rpm as follows:

In power mode (referring 2100 rpm as an example):

the no-load rpm is 2100 rpm;

the full-load rpm is 2000 rpm; and the engine speed drops by approximately 100 rpm to reach from no-load to full-load of power mode (please refer power mode governing line).

In normal mode (referring 2100 rpm as an example):

the no-load rpm is 2100 rpm;

the full-load rpm is 1900 rpm; and the engine speed drops approximately by 200 rpm to reach from no-load to full-load of normal mode (please refer normal mode governing line).

In diesel saver mode (referring 2100 rpm as an example):

the no-load rpm is 2100 rpm;

the full-load rpm is 1900 rpm; and the engine speed drops by approximately 200 rpm to reach from no-load to full-load of diesel saver mode (please refer diesel saver mode governing line).

For all the 3 modes, the difference between no-load and full load rpm can be varied depending on the required tradeoff between productivity and fuel efficiency.

In an embodiment, the system 100 includes a plurality of sensors 102 configured to sense various parameters of the fuel injection system 106. The plurality of sensors 102 is further configured to generate sensed signals. The ECU 104 is configured to cooperate with the sensors 102 to receive the sensed signals. The ECU 104 is further configured to control the fuel injection system 106 according to the inputs received by the ECU 104 from said sensors 102. In another embodiment, the plurality of sensors 102 includes accelerator pedal sensor and the like.

In an operative configuration, when the work vehicle is running on a flat terrain or flat road or a low load condition, the operator/driver actuates the first mode activation switch 101A to generate a first mode selection signal. The first mode selection signal is received by the ECU 104. The ECU 104 also receives sensed RPM signal from the RPM sensor 110, and accordingly reads and extracts a unique control signal value from the repository 108 corresponding to the diesel saver mode of engine operation selected by the operator to generate a first control signal to activate the fuel injection system 106. The fuel injection system 106 injects a predetermined quantity of fuel and corresponding drivability/exhaust gas recirculation (EGR)/timings maps, etc. to run the vehicle in diesel saver mode. Similarly, the operator/driver may activate the second mode activation switch 101B to generate a second mode selection signal. The ECU 104 would then receive the second mode selection signal, and the ECU 104 would also receive the sensed engine RPM signal from the RPM sensor 110. The ECU 104 would read and extract a unique control signal value from the repository 108 corresponding to the normal mode of engine operation selected by the operator to generate a second control signal to activate the fuel injection system 106. Further, when the vehicle is running on a sudden load/high load condition, the operator/driver actuates the third mode activation switch 101C to generate a third mode selection signal, and the ECU 104 also receives the sensed engine RPM signal from the RPM sensor 110. The ECU 104 reads and extracts a unique control signal value from the repository 108 corresponding to the power mode of engine operation selected by the operator to generate a second control signal to activate the fuel injection system 106.

Thus, the system 100 allows a vehicle to operate in different operating modes as per the load condition. The mode selection feature of the system 100 facilitates a driver/operator to select an operating mode as per requirement. The system 100 enables a user to select a suitable mode for a specific requirement of fuel consumption and productivity. Also, the system 100 is user-friendly i.e. the operator/driver just needs to activate the mode device 101 as per the varying load condition, and the system 100 will select the drivability.

The foregoing description of the embodiments has been provided for purposes of illustration and not intended to limit the scope of the present disclosure. Individual components of a particular embodiment are generally not limited to that particular embodiment but are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of an engine control system for enabling multi-mode drivability in off-road vehicles, that:

allows a vehicle to operate in different operating modes as per varying load conditions;

enables a driver/operator to select an operating mode as per requirement;

enables a user to select a suitable mode for a specific requirement of fuel consumption and productivity; and is user friendly.

The embodiments herein, the various features, and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An engine control system for facilitating multi-mode drivability in off-road diesel-engine driven vehicles, said system comprising:

a) a mode selection device configured to receive a signal indicating an operator-selectable input of at least one mode of engine operation of an off-road diesel-engine driven vehicle, and to generate a mode selection signal corresponding to the input; and b) an electronic control unit (ECU) communicatively coupled with said mode selection device to receive said mode selection signal and generate at least one control signal, and further configured to control a fuel injection system of the vehicle based on the selected mode according to a load requirement, thereby facilitating multi-mode drivability;

wherein said ECU, in response to said mode selection signal, is configured:

i. to generate a first control signal to activate said fuel injection system to inject a predetermined quantity of fuel into cylinders of the engine and activate specific drivability, exhaust gas recirculation (EGR), timing and combustion maps to run said engine in an economy or diesel saver mode;

ii. to generate a second control signal to activate said fuel injection system to inject a first predetermined higher quantity of fuel than the predetermined quantity of fuel corresponding to said first control signal into the cylinders of the engine and activate specific drivability, exhaust gas recirculation (EGR), timing and combustion maps to run said engine in a normal mode; and iii. to generate a third control signal to activate said fuel injection system to inject a second predetermined higher quantity of fuel than the first predetermined higher quantity of fuel corresponding to said second control signal into the cylinders of the engine and activate specific drivability, exhaust gas recirculation (EGR), timing and combustion maps to run said engine in a boost or power mode.

2. The system as claimed in claim 1, wherein said fuel injection system is a common rail fuel injection system.

3. The system as claimed in claim 1, wherein said mode selection device includes:

a) a first mode activation switch communicatively coupled with said ECU, said first mode activation switch configured to generate a first mode selection signal to be communicated to said ECU to generate said first control signal;

b) a second mode activation switch communicatively coupled with said ECU, said second mode activation switch configured to generate a second mode selection signal to be communicated to said ECU to generate said second control signal; and c) a third mode activation switch communicatively coupled with said ECU, said third mode activation switch configured to generate a third mode selection signal to be communicated to said ECU to generate said third control signal.

4. The system as claimed in claim 1, wherein said system includes a repository and an engine RPM sensor, said engine RPM sensor communicatively coupled with said ECU and configured to generate a sensed engine RPM signal, said repository configured to store a plurality of engine operation maps corresponding to the modes of engine operation, each of said engine operation maps including distinct control signal values for fuel injection, drivability, exhaust gas recirculation (EGR), timing and other combustion maps corresponding to sensed engine RPM signal values, said ECU configured to read said repository and extract a unique control signal value corresponding to:

a) the mode of engine operation selected by said operator through said mode selection device, and b) an instantaneous sensed RPM signal value.

5. The system as claimed in claim 1, wherein said fuel injection system is a common rail fuel injection system; wherein said ECU is configured to generate control signals for said common rail fuel injection system to inject 10-15% more fuel than economy mode into the cylinders of the engine, on receipt of said second mode selection signal.

6. The system as claimed in claim 1, wherein said fuel injection system is a common rail fuel injection system; wherein said ECU is configured to generate control signals for said common rail fuel injection system to inject 10-15% more fuel than normal mode into the cylinders of the engine, on receipt of said third mode selection signal.

7. The system as claimed in claim 4, wherein said maps are based on at least one of torque response curves, fueling response curve, governing performance curve, and exhaust gas recirculation (EGR), timing maps/or high idle curve as defined for each of an economy mode, normal mode and boost mode.

8. The system as claimed in claim 1, which includes a plurality of sensors including an accelerator pedal sensor; said plurality of sensors configured to sense various parameters of said fuel injection system, and further configured to generate sensed signals, wherein said ECU is configured to cooperate with said plurality of sensors to receive said sensed signals, and further configured to control said fuel injection system.

* * * * *